(12) United States Patent
McLeod et al.

(10) Patent No.: US 11,511,937 B2
(45) Date of Patent: Nov. 29, 2022

(54) AUTOMATED GARMENT KIOSK

(71) Applicant: Garment Management Systems, LLC, Little Rock, AR (US)

(72) Inventors: Brett McLeod, Little Rock, AR (US); Ed Hill, Little Rock, AR (US)

(73) Assignee: Garment Management Systems, LLC, Little Rock, AR (US)

( * ) Notice: Subject to any disclaimer, the term of this patent is extended or adjusted under 35 U.S.C. 154(b) by 307 days.

(21) Appl. No.: 17/003,506

(22) Filed: Aug. 26, 2020

(65) Prior Publication Data

US 2022/0063911 A1  Mar. 3, 2022

(51) Int. Cl.
| | |
|---|---|
| *G06F 7/00* | (2006.01) |
| *B65G 1/04* | (2006.01) |
| *B65G 1/133* | (2006.01) |
| *B65G 11/02* | (2006.01) |
| *G07F 17/00* | (2006.01) |
| *B65G 1/137* | (2006.01) |
| *G06F 3/04886* | (2022.01) |
| *G06K 7/08* | (2006.01) |

(52) U.S. Cl.
CPC ......... *B65G 1/0485* (2013.01); *B65G 1/0457* (2013.01); *B65G 1/133* (2013.01); *B65G 1/1371* (2013.01); *B65G 11/023* (2013.01); *G07F 17/0014* (2013.01); *B65G 2201/0229* (2013.01); *B65G 2203/0233* (2013.01); *G06F 3/04886* (2013.01); *G06K 7/082* (2013.01)

(58) Field of Classification Search
CPC .... B65G 1/0485; B65G 1/0457; B65G 1/133; B65G 1/1371; B65G 11/023; B65G 2201/0229; B65G 2203/0233; G07F 17/0014; G07F 11/005; G07F 11/54; G07F 17/12; G07F 9/009; G06F 3/04886; G06K 7/082; G06Q 20/34
USPC ................................. 700/213–215, 231–232
See application file for complete search history.

(56) References Cited

U.S. PATENT DOCUMENTS

| | | |
|---|---|---|
| 3,707,261 A | 12/1972 | Cutter |
| 3,917,112 A | 11/1975 | Willis et al. |

(Continued)

FOREIGN PATENT DOCUMENTS

| | | |
|---|---|---|
| GB | 1317306 | 7/1970 |
| GB | 1431253 | 4/1976 |
| WO | 83/04119 | 11/1983 |

OTHER PUBLICATIONS

"CoatChex Ticketless Coat Check System," downloaded from http://coatchex.com on Aug. 6, 2013 (2012).

(Continued)

*Primary Examiner* — Yolanda R Cumbess

(57) ABSTRACT

An automated kiosk includes a front panel positioned in front of a conveyor with conveyor slots sized to receive clothing hangers. Dividers separate each conveyor slot from the adjacent conveyor slots, forming a compartment for each conveyor slot. Two doors are positioned in the front panel. An electronic controller moves a conveyor in order to reposition a desired compartment in front of the doors. The doors open inwardly, and are of sufficient length that the extended edge of the doors engages with and overlaps the outer edge of each of the dividers. With each door engaging the divider on each side of the compartment, a user is blocked from being able to access items that are in adjacent compartments.

19 Claims, 7 Drawing Sheets

(56) References Cited

U.S. PATENT DOCUMENTS

| | | | |
|---|---|---|---|
| 4,519,522 A | | 5/1985 | McElwee |
| 4,717,305 A | | 1/1988 | Edwards |
| 4,803,348 A | | 2/1989 | Lohrey et al. |
| 4,821,538 A | | 4/1989 | Gray |
| 5,025,140 A | | 6/1991 | Varley |
| 5,351,803 A | | 10/1994 | Speckhart et al. |
| 5,509,572 A | | 4/1996 | Curtis |
| 7,245,988 B1 | | 7/2007 | Terepka |
| 7,886,971 B2 | | 2/2011 | Cassady et al. |
| 9,120,624 B1 | * | 9/2015 | Cassady ............ G06Q 10/0836 |
| 2016/0066732 A1 | * | 3/2016 | Sarvestani ........... A47G 29/141 232/24 |

OTHER PUBLICATIONS

"IDSCAN—ID Scanners and ID Check Biometric for Clubs Pubs Bars," downloaded from http://nightclub.co.uk/uk_products_cloakscan.php on Aug. 6, 2013.

* cited by examiner

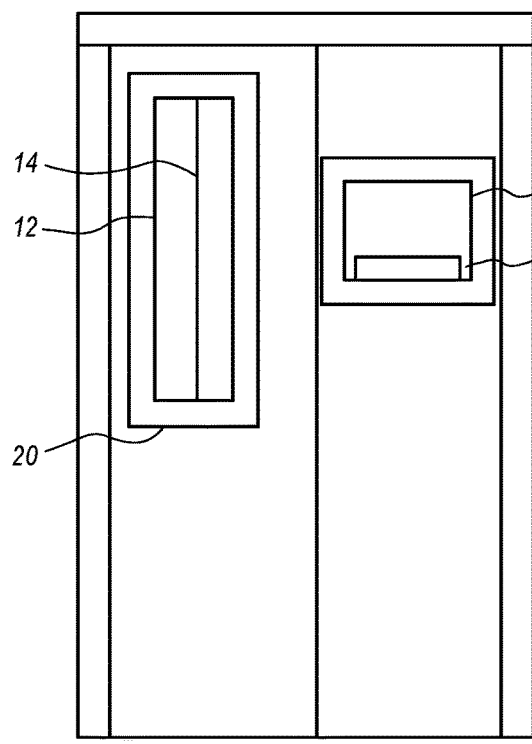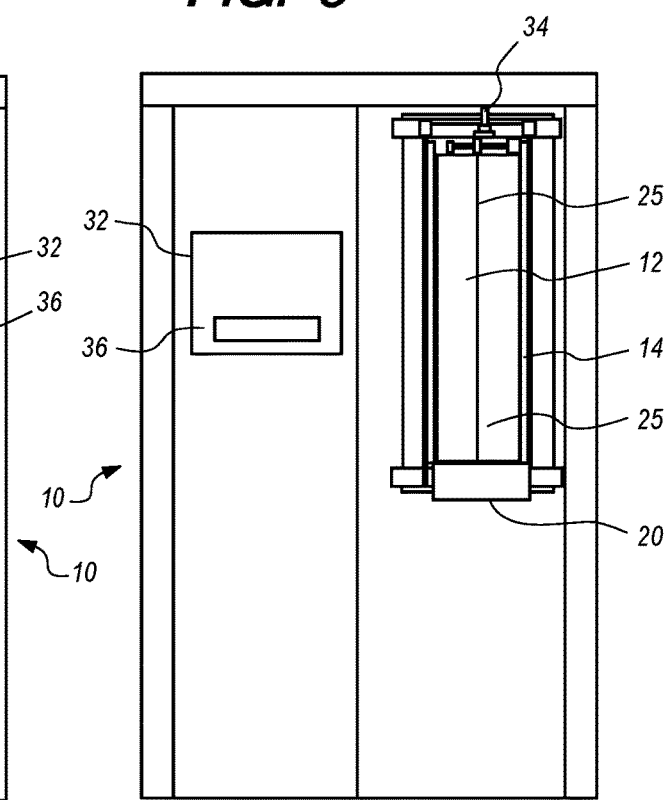

AUTOMATED GARMENT KIOSK

BACKGROUND OF THE INVENTION

Automated kiosks are a common means of providing self-service dispensing of desired goods to customers. Automated kiosks include the "JacketRak" automated coat system developed by Garment Management Systems, Inc. of Little Rock, Ark. A customer desiring to use the JacketRak device approaches a touchscreen display on the machine in order to begin the check-in process. A form of identification is scanned to identify the customer. Behind the front wall, the system includes coat hangers separated by dividers along a conveyor, with the area between any two dividers forming a separate compartment. After the customer presents a form of identification to a reader, the device automatically rotates the conveyor until an empty compartment is presented at the vertically-oriented doors of the device. The doors then unlock, so that the customer may then open the doors outwardly and insert a garment onto the coat hanger in the accessible compartment. The dividers keep the customer from accessing any coat or jacket that might be hanging in an adjacent compartment. After the customer deposits a coat or jacket onto the coat hanger and closes the doors, the system locks the doors and prints out a receipt. For later pick up, the customer uses the same form of identification. The machine correlates the customer's identification with the particular compartment into which the customer's coat were hung. The device then rotates the conveyor to the point where the corresponding compartment lines up with the doors. The doors again unlock, which allows the customer to open the doors outwardly and retrieve the customer's coat from the compartment, after which the doors again are closed and locked.

The JacketRak device was intended for deployment at indoor locations that are actively monitored by employees. These locations include casinos, restaurants, and theaters. But the device is not suitable for outdoor use or for use in areas where the operation of the machine is not actively monitored. The reason for this is that a customer who desires to steal or vandalize the clothes of another customer could reach around or move the dividers that separate each compartment from the next. It may therefore be seen that a more secure kiosk device is needed for use in outdoor or unmonitored locations, such as, for example, a dry cleaner that provides after-hours pick-up of cleaned clothing items with an outdoor-facing kiosk device.

References mentioned in this background section are not admitted to be prior art with respect to the present invention.

BRIEF SUMMARY OF THE INVENTION

The present invention is directed to an automated kiosk and a method of using such an automated kiosk. In certain implementations of the present invention, the kiosk includes a front panel with a conveyor behind the front panel. A motor moves the conveyor around a conveyor frame. Along the conveyor are a number of conveyor slots sized to receive clothing hangers. A plurality of dividers is also attached to the conveyor and hang downwardly, dividing each conveyor slot from the adjacent conveyor slots. The space between two adjacent dividers that contains a conveyor slot forms a compartment. The front panel has a door opening with two adjacent doors mounted in the door opening. An electronic controller communicates with the motor in order to move the conveyor and thus reposition compartments with respect to the door opening. The doors open inwardly, and are of sufficient width that the inside edge of the doors engages with and overlaps an outer edge of the adjacent divider, aided by fingers extending from the top and bottom of each door. With each door engaging the divider on each side of the compartment, a user is blocked from being able to see or touch items that are in adjacent compartments of the device. The combination of the dividers and the opened doors positioned against the dividers forms a closed compartment, thereby protecting clothing in adjacent compartments from vandalization or theft.

To operate the automated kiosk according to certain implementations of the present invention, a user input device is presented, such as a touchscreen display and card reader. The customer chooses to either drop off or pick up garments. The card reader inputs personal information from an identification card. During drop off, a receipt is generated. (Alternatively, the system may send a text message, an email, a communication through a smartphone app, or other form of communication to the customer containing a PIN code by which the user may later access the garments, in which case no reader or printer may be required.) Then the controller assigns a particular empty compartment to the customer, rotates that compartment around the conveyor until it aligns with the doors, and then unlocks the doors. The doors open inwardly so that the user has access to the compartment. When the garments have been dropped off, the doors close and lock. If the user selects pick up, then the controller looks at the personal information from the user's card scan or the PIN code input by the customer, and searches for the compartment that matches this user identification or PIN code. The controller rotates the compartment to align with the doors, and then unlocks the doors. The doors open inwardly so that the user has access to his or her garments. When the garments have been retrieved from the compartment and the doors are closed, the controller locks the doors.

In an alternative embodiment, the kiosk operates only in a pick-up mode, where the clothes are hanging from wire hangers attached at conveyor slots awaiting pick up by the owner. Optionally, an alternative drop-off system may be used, such as through a garment chute.

These and other features, objects and advantages of the present invention will become better understood from a consideration of the following detailed description of the preferred embodiments and appended claims in conjunction with the drawings as described following:

BRIEF DESCRIPTION OF THE SEVERAL VIEWS OF THE DRAWINGS

FIG. 5 is a front elevational view of the front panel according to a particular implementation of the present invention.

FIG. 6 is a back elevational view of the front panel according to a particular implementation of the present invention.

DETAILED DESCRIPTION OF THE PREFERRED EMBODIMENT(S)

Before the present invention is described in further detail, it should be understood that the invention is not limited to the particular implementations described herein. The terms used in describing the particular implementations are for the purpose of describing those particular implementations only, and are not intended to be limiting, since the scope of the present invention will be limited solely by the claims.

Figure 1:
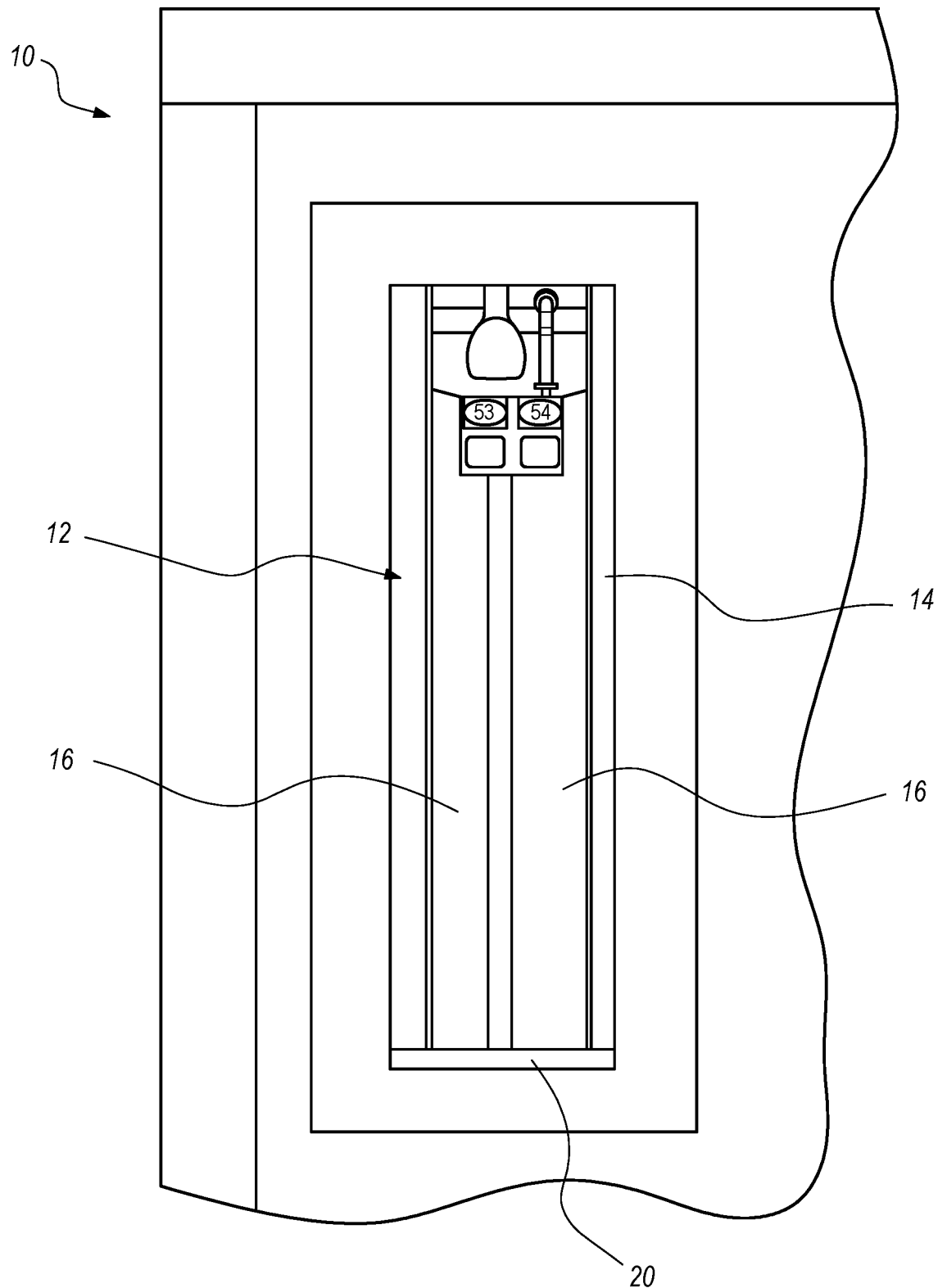
FIG. 1 is a front elevational view of a front panel and doors according to a particular implementation of the present invention.
Figure 2:
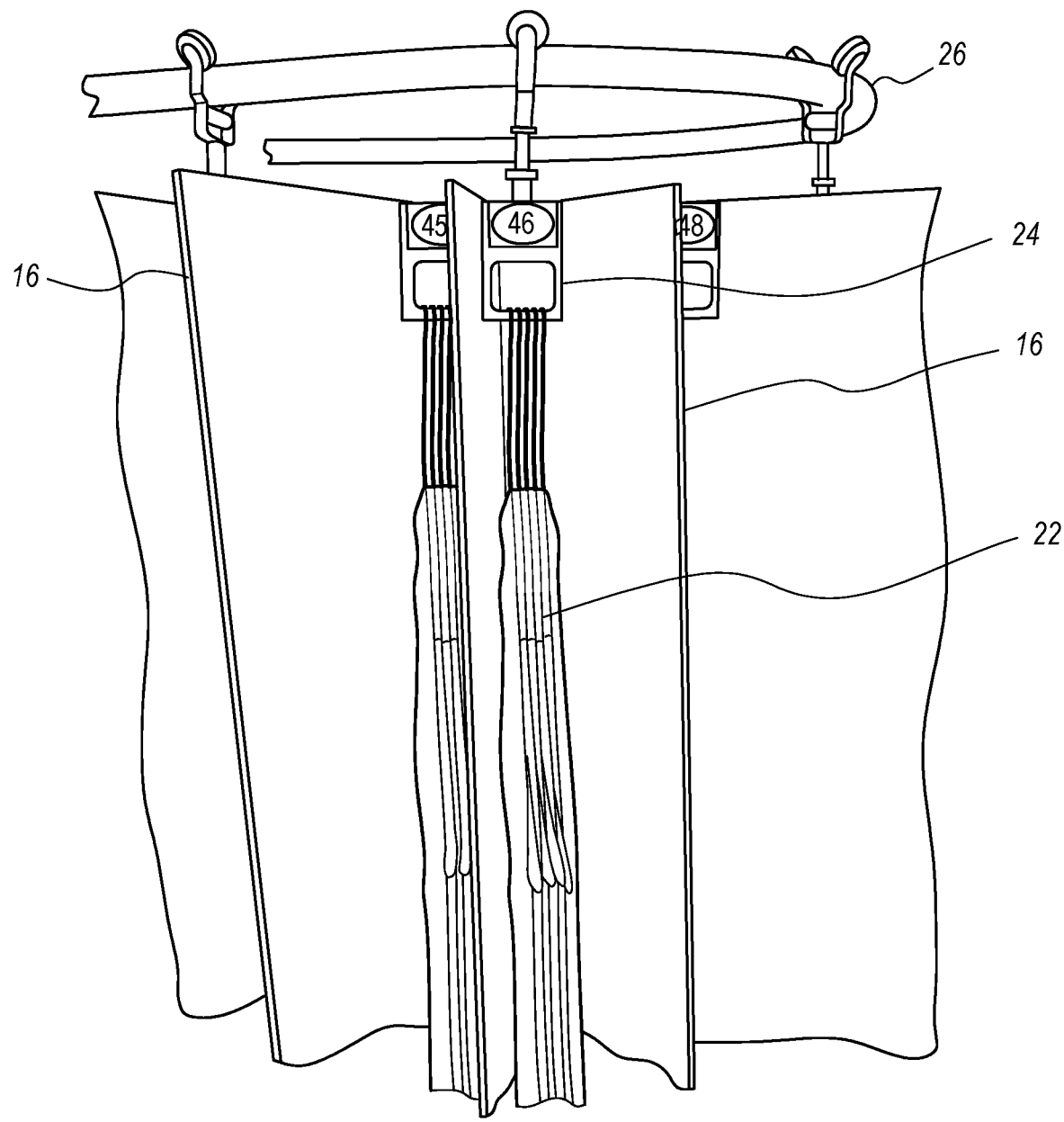
FIG. 2 is a front elevational view of a compartment with garments (as seen without the front panel in place) according to a particular implementation of the present invention.
Figure 3:
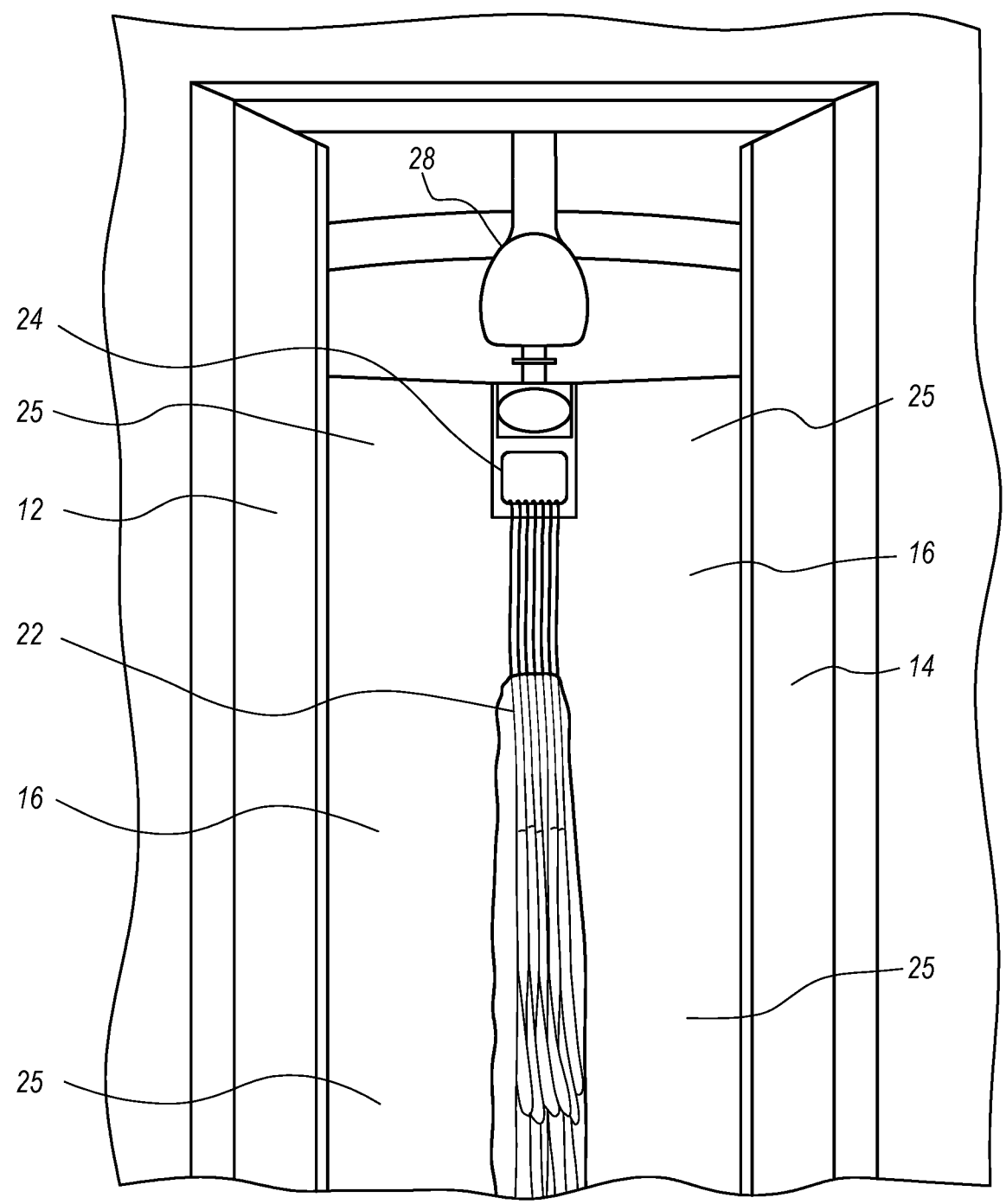
FIG. 3 is a front elevational view of a compartment with garments as seen between the open doors on the front panel according to a particular implementation of the present invention.
Figure 4:
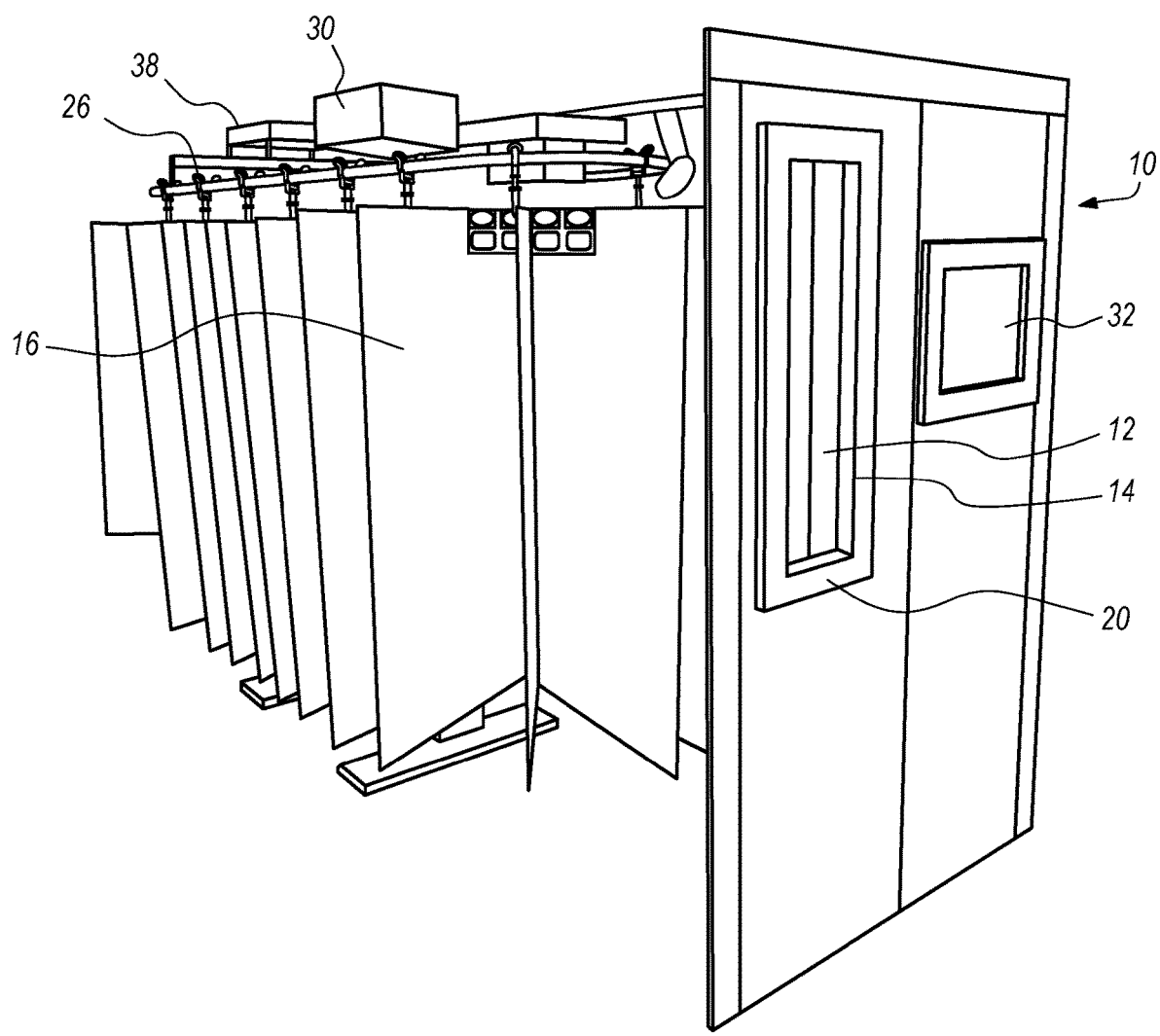
FIG. 4 is a perspective view of an automated kiosk according to a particular implementation of the present invention.
Figure 7:
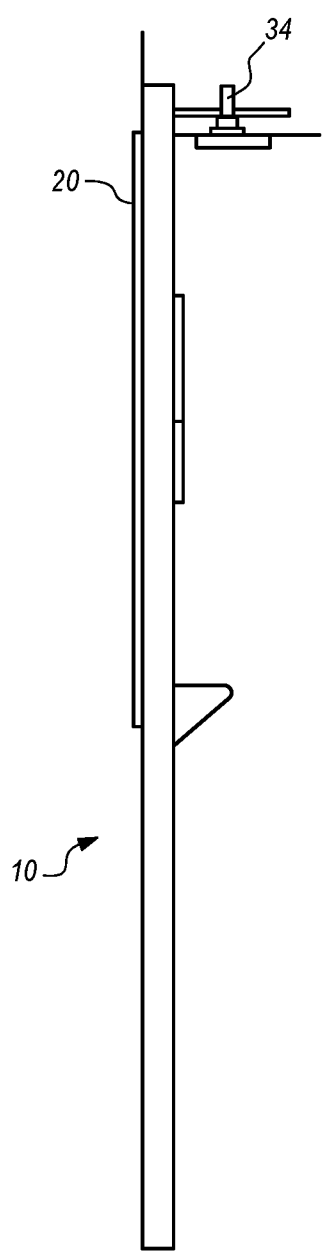
FIG. 7 is a side elevational view of the front panel according to a particular implementation of the present invention.
Figure 8:
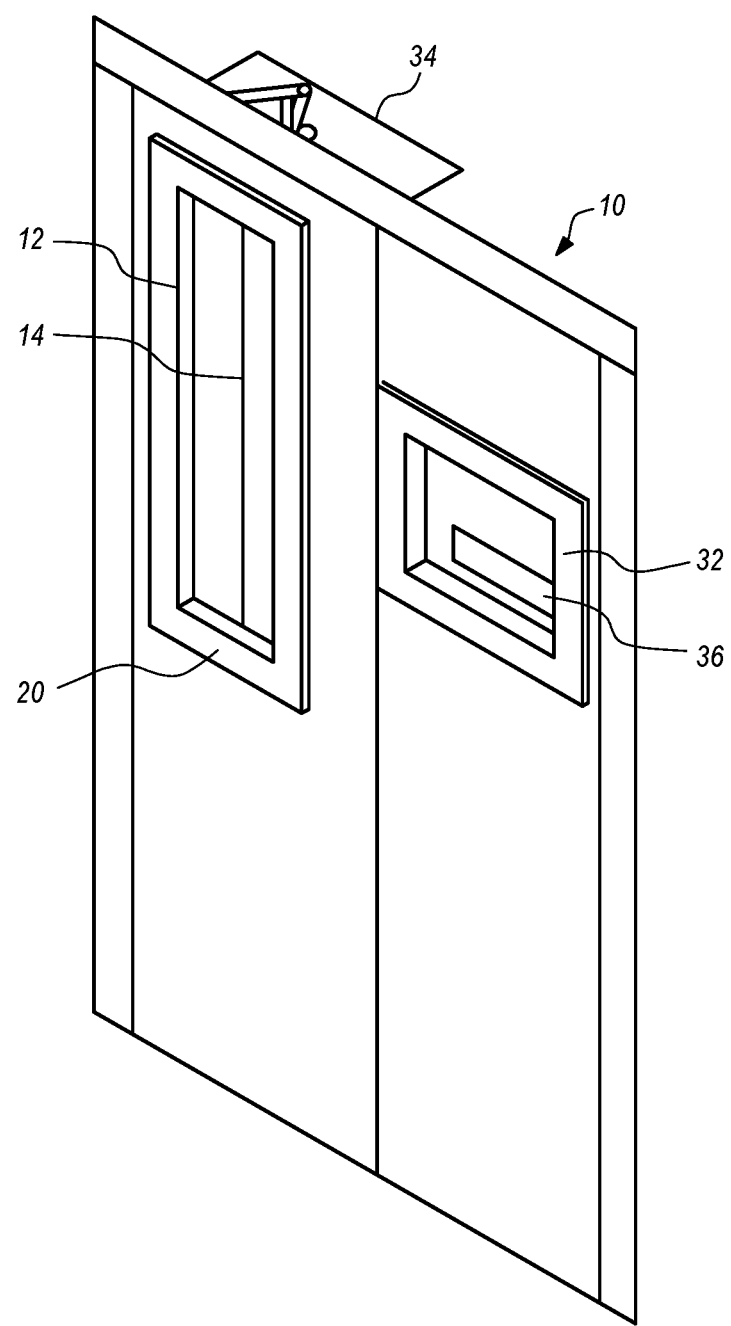
FIG. 8 is a perspective view of a front panel according to a particular implementation of the present invention.
Figure 9:
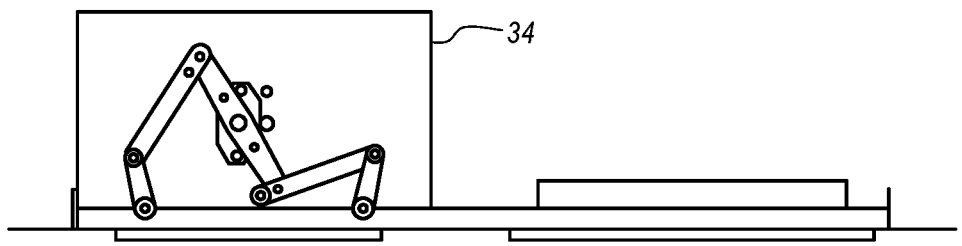
FIG. 9 is a top plan view of a door linkage according to a particular implementation of the present invention.

The various components of the invention may be described with reference to FIGS. 1-9. A front panel 10 forms a barrier between the kiosk and its various internal components and the customer. Front panel 10 also forms a barrier that protects garments 22 from theft or vandalism. Front panel 10 may be mounted, for example, at an opening in a building wall, so that front panel 10 is accessible from outside the building but the internal components of the device are protected within the interior of the building. Similarly, front panel 10 may be mounted along an interior wall, such that the device is accessible by a customer from a position outside the wall, such as in a hallway, while the internal components of the device are protected in a locked room.

At door opening 20 in front panel 10, there are two elongated, inward opening doors, left door 12 and right door 14. These two doors are linked together by door linkage 34 (shown in detail in FIG. 9). The doors may be constructed of, for example, Lexan brand polycarbonate, with aluminum framing for strength and light weight. Doors 12 and 14 may alternatively be constructed of glass, or may be formed of an opaque material. The length of doors 12 and 14 may vary depending upon the application. For example, in the application where the device is used to pick up or drop off clothing at a dry cleaners, the length of the doors may be such as to easily allow laundered shirts or pants folded over a hanger to pass through. In the application where the device is used as a coat check, doors 12 and 14 may be longer and extend further downward, such that a full-length coat may easily pass through.

Behind front panel 10 is conveyor 26, which is positioned on a conveyor track. The purpose of conveyor 26 is to rotate a desired garment or set of garments 22 towards door opening 20. The size and footprint of conveyor 26 may be varied as desired in order to accommodate the desired number of sets of garments 22.

Conveyor 26 may be designed as a standard dry-cleaning conveyor, in which case the shape and length of conveyor 26 may be adjusted or configured to fit the space available while still providing enough space for the desired number of sets of garments 22.

Suspended beneath conveyor 26 is a plurality of conveyor slots 24. As shown, the conveyor slots are simple numbered openings that are sized to receive hangered garments 22, with the hangers being hung over the lower lip of conveyor slots 24. Many alternative arrangements may be substituted so long as there is a means provided for supporting garments 22. Alternatively, conveyor slots 24 could be replaced by built-in hangers, or coat hangers could be positioned in conveyor slots 24 by the operator of the device, in an implementation of the invention for use as a coat check kiosk.

Between each of the conveyor slots 24 is a divider 16. Each divider 16 may be made of a reasonably strong, light, stain resistant, and resilient material, such as such as expanded PVC. Many other materials may be substituted in place of PVC. For improved security, dividers 16 may be formed of a stronger material, such as aluminum or steel. Dividers 16 extend outwardly in order to separate each conveyor slot 24 into its own compartment.

Each of doors 12 and 14 may, in certain implementations, include fingers 25 that are attached to the doors and extend outwardly from their inside edges. The purpose of fingers 25 is to aid with engagement between the extending edges of doors 12 and 14 and dividers 16 on either side of the conveyor slot 24 with which door opening 20 is aligned. The fingers 25 may be straight or may be bent inwardly, depending upon which configuration results in a better engagement between fingers 25 and dividers 16 in a particular implementation. In addition to providing a more positive engagement between doors 12 and 14 and each corresponding divider 16, the fingers 25 may also serve to help straighten the dividers as they are presented to the customer removing garments, as the dividers 16 may become skewed during operation of the system due to the forces created by movement of conveyor 26.

A bar-code reader 28 may optionally be attached to the frame of conveyor 26 or to front panel 10 or any other convenient point on the kiosk, and pointed in a direction such that it reads a bar code positioned adjacent to the conveyor slot 24 in the compartment that is aligned with door opening 20. The bar-code reader 28 may be used to confirm that the conveyor 26 is turned to the correct position by checking whether the bar code adjacent to the conveyor slot 24 matches the intended conveyor slot 24 number.

A motor 30 (shown in FIG. 4) is mounted on conveyor 26 and serves to power the movement of conveyor 26 around the circumference of conveyor 26.

A controller 38 (also shown in FIG. 4) is mounted on the frame of conveyor 26, although it could be mounted in any other location so long as it is in communication with certain components of the device. Controller 38 serves to receive inputs and send instructions to the various components of the kiosk to function automatically. Controller 38 is communicationally connected with motor 30, bar-code reader 28, touchscreen 32, and/or card reader 36, for reasons that will be clear when the operation of the device is described below. Controller 38 may be, for example, a programmable logic controller (PLC) device, a full-fledged programmable computer, or any other device capable or performing calculations and receiving and sending electronic signals either through wired communications networks or wireless communications networks.

Touchscreen 32 is positioned on front panel 10, in a secure manner to discourage vandalism or theft with respect to touchscreen 32. Touchscreen 32 is designed to receive inputs from a consumer in the form of touches to the screen corresponding to on-screen software buttons or displays, and also to display information output from controller 38 to the consumer. Card reader 36, used in only certain implementations of the invention, is designed to read information stored electronically or magnetically on cards presented by the consumer, such as credit cards, debit cards, or identification cards such as a driver's license. In alternative embodiments, card reader 36 may be replaced with a bar code scanner, biometric reader, RFID reader, or any combination of these devices, or any other types of devices for confirming the identity of a person or receiving a payment. A printer (not shown) may be positioned behind front panel 10 such that it can dispense a paper receipt through a slot in front panel 10; the printer is also in communication with controller 38 in order to determine when to print a receipt and what information should be printed on the receipt. The printer and/or the card reader 36 may be omitted in implementations of the invention where no receipt is required to pick up garments 22, such as when a text message or other communication is transmitted to the customer with a PIN code usable to access garments 22.

The operation of the kiosk will now be described with reference to FIGS. 1-9, in a kiosk that is designed to both receive dirty garments 22 from a consumer, and also to dispense the consumer's cleaned garments 22 back to the consumer after cleaning. As a consumer approaches the kiosk, touchscreen 32 will display two software buttons, one for pick up and one for drop off. If the consumer selects drop off, then controller 38 receives that input and, in certain implementations, prompts the user to present a card to card reader 36. Once this information is read, it is transmitted to controller 38 for further processing. A receipt may also be generated at the printer and presented to the consumer in certain implementations. The receipt may, for example, include a transaction identification number and a pick-up time for the cleaned garments 22. Alternatively, a text message may be sent to the consumer's smartphone in order to achieve these objectives of the invention. In certain implementations, a load station (not shown) is used in conjunction with the system. The load station is in electronic communication with conveyor 26. The load station is operated by a human in order to control operation of the system. It may include, for example, a touchscreen or traditional monitor, a keyboard, and a mouse, and may include a bar code scanner connected to controller 38. The load station allows a human to assign compartments to a particular consumer and provide information to controller 38 software. This information may include the location of a particular order, a corresponding PIN number, etc. The assigning of compartments can alternatively be performed by third-party software, such as a cleaner point-of-sale (POS) system by interfacing with the controller via an Internet connection or other wired or wireless connection technology.

Once the information has been communicated to controller 38, controller 38 then assigns one of the compartments (corresponding with a numbered conveyor slot 24) to the consumer, and rotates conveyor 26 until this particular compartment is positioned directly adjacent to door opening 20. Controller 38 retains some items of identifying data in an electronic storage medium, which forms a part of controller 38. The purpose for storing this data is to be able to associate that data with a particular numbered conveyor slot 24, whereby controller 38 will be able to return the consumer's garments 22 after cleaning.

Once the correct compartment is positioned at door opening 20, controller 38 sends a signal to unlock left door 12 and right door 14. The doors are linked together by door linkage 34, and thus they open and close together. The doors are hinged to open inwardly only. The doors 12 and 14 include two sets of electromagnetic locks, one to hold the doors open and the other to hold the doors closed. A door closer incorporated into door linkage 34 automatically closes the doors if they are not being held open by the electromagnetic locks. During a pick-up operation, controller 38 first de-energizes the electromagnetic locks holding the doors closed and energizes the electromagnetic locks that hold the doors open. When the customer pushes doors 12 and 14 open (inwardly), they stop when the doors reach the electromagnets that hold the doors open, and remain there until the door open electromagnets are de-energized.

As doors 12 and 14 open, they will come into contact with and overlap the front edge of the two dividers 16 forming the compartment directly behind door opening 20. In this way, the consumer will be given access to the correct compartment, but will be unable to see into or access any other compartment. Doors 12 and 14, together with their adjacent dividers 16, form barriers that block access to either adjacent compartment. The user is then prompted at touchscreen 32 to place his or her garments 22 into the compartment at conveyor slot 24.

After a period of time, controller 38 will then send a signal to de-energize the electromagnets that hold doors 12 and 14 open. When the door open electromagnets are de-energized, the door closer of door linkage 34 causes the doors to automatically close. The door closed electromagnets are then energized to again lock the doors in the closed position. The period of time before the doors 12 and 14 close may be a pre-programmed period of time. Alternatively, a proximity detector (not shown) may be used such that the doors 12 and 14 remain open until the consumer's hand and arm are removed from the compartment, at which time doors 12 and 14 will then close and lock.

If a user later returns to pick up garments 22, then the appropriate software button at touchscreen 32 will be displayed. The user again scans a card at card reader 36, or inputs a PIN code that has been received by the user earlier. Information from the card is compared by controller 38 to information that is of record and stored on the electronic storage medium. Controller 38 is thus able to match the returning consumer with the compartment associated with the numbered conveyor slot 24 that contains consumer's garments 22. Note that the compartment in which the consumer's garments 22 are presented after cleaning may be the same compartment used for drop-off, or may be a new compartment. If a new compartment is used, then the cleaner will need to update information at controller 38 so that it still presents the correct compartment for each consumer who has left garments 22 for cleaning.

Once the correct compartment is identified, controller 38 causes conveyor 28 to turn until the correct compartment is again aligned at door opening 20. Doors 12 and 14 operate in a manner similar to the drop-off mode, with the doors 12 and 14 overlapping the dividers 16 forming this compartment so that the user cannot see into or access adjacent compartments. The user may then remove his or her cleaned garments 22 from the compartment, and after a time period (as explained with respect to drop-off) controller 38 sends instructions to lock doors 12 and 14 closed.

In an alternative embodiment of the invention, the drop-off component of the process may be replaced by the use of a drop-off chute or box. In those implementations of the invention using a printer, the customer may be prompted to put the receipt received from the printer together with the garments 22 to be cleaned, such as by attaching the receipt to a bag or other container for garments 22. In this manner, it is possible for controller 38 to match the consumer with his or her garments 22 when the consumer returns to pick up the clothes in the process as described above. Alternatively, the system may generate a text message to the customer with a PIN code, which is used in order to pick up garments 22 without the need for a receipt. In certain implementations that do not require the use of a printer, the consumer may bring in his or her garments in a bag issued by the dry-cleaning company, which has a tag issued to the user with all required information necessary to associate the garments with a particular consumer upon the consumer's return to pick up the cleaned garments.

Various forms of payment may be contemplated in connection with the kiosk. In some implementations there may be no payment, such as the case where a particular establishment offers coat check, cleaning, or like services as a perk for being a patron of the establishment. In other cases, payment may be made at card reader 36 by presenting a payment form, such as a credit card or debit card. In this case, controller 38 will link to a financial services network in order to verify the consumer's card and to confirm the payment that has been made. Processing then proceeds as explained above in such case.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. When a grouping is used herein, all individual members of the group and all combinations and subcombinations possible of the group are intended to be individually included. When a range is stated herein, the range is intended to include all subranges and individual points within the range. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention, as set forth in the appended claims.

The invention claimed is:

1. An automated garment kiosk, the kiosk comprising:
   a. a conveyor;
   b. a motor configured to move the conveyor;
   c. a plurality of conveyor slots suspended beneath the conveyor;
   d. a plurality of dividers suspended beneath the conveyor, wherein each conveyor slot is positioned between two of the plurality of dividers forming one of a plurality of compartments;
   e. a front panel positioned in front of the conveyor, wherein the front panel comprises a door opening;
   f. first and second doors fitted into the door opening, wherein an edge of each of the first and second doors reaches sufficiently far when the doors are opened inwardly that the inner edges overlap an outer edge of each of the two dividers that form a compartment aligned with the doors, wherein access to compartments adjacent to the compartment aligned with the doors is blocked from a consumer position in front of the front panel;
   g. a controller in communication with the motor and configured to send a signal to stop and start the conveyor, wherein the controller is further in communication with the first and second doors and configured to lock and unlock the first and second doors; and
   h. at least one user input and output device in communication with the controller, wherein the at least one user input and output device is configured to receive user instructions and user identification data, and send the user instructions and user identification data to the electronic controller.

2. The kiosk of claim 1, further comprising at least one finger attached to each of the doors and extending inwardly therefrom, whereby each finger engages with one of the two dividers that form the compartment aligned with the doors when the doors are opened.

3. The kiosk of claim 2, wherein the at least one user input and output device further comprises a card reader.

4. The kiosk of claim 1, further comprising a bar-code reader, wherein the bar-code reader is directed toward the conveyor slot in the compartment that is aligned with the first and second doors.

5. The kiosk of claim 1, further comprising a drop chute to receive garments from a consumer during a drop-off procedure.

6. The kiosk of claim 1, wherein the conveyor is supported by a conveyor frame.

7. An automated kiosk, comprising:
   a. a panel;
   b. a doorway in the panel;
   c. first and second doors positioned in the doorway;
   d. a conveyor behind the panel;
   e. a plurality of dividers hanging from the conveyor, wherein a compartment is formed between each pair of adjacent dividers; and
   f. a controller configured to open the first and second doors inwardly to such an extent that the first door contacts and overlaps a leftmost divider and the second door contacts and overlaps a rightmost divider, whereby access to compartments other than the compartment aligned with the first and second doors is prevented.

8. The kiosk of claim 7, further comprising a motor in communication with the conveyor and operable to rotate the conveyor.

9. The kiosk of claim 8, further comprising at least one conveyor slot positioned in each compartment.

10. The kiosk of claim 9, wherein each divider extends downwardly at least as far as a bottom of the doorway.

11. The kiosk of claim 10, further comprising a controller in communication with the motor, wherein the controller is configured to send instructions to the motor to move the conveyor.

12. The kiosk of claim 11, wherein the controller is further configured to send instructions to the doors to unlock the first and second doors and to lock the first and second doors.

13. The kiosk of claim 12, further comprising a drop-off chute sized to receive garments from the consumer.

14. The kiosk of claim 12, further comprising a reader in communication with the controller, the reader configured to read magnetic or electronic information from a customer card.

15. The kiosk of claim 12, further comprising at least one finger attached to each of the first and second doors.

16. The kiosk of claim 12, further comprising a touch-screen display on the panel to receive inputs from a user and to send corresponding instructions to the controller.

17. A method for operating an automated garment kiosk, the method comprising the steps of:
   a. receiving a pick-up input at an input device;

b. in response to the pick-up input, receiving a user identification from a reader, and identifying a compartment from a plurality of compartments that is associated with the user identification;

c. rotating the one of a plurality of compartments associated with the user identification to align with a doorway and a pair of doors mounted in the doorway;

d. unlocking the pair of doors whereby the pair of doors may be opened inwardly, wherein an interior edge of each of the doors engages with and overlaps an outer edge of each of two dividers that define the compartment; and e. after waiting for a first time period, closing the two doors.

18. The method of claim 17, further comprising the steps of:

a. receiving a drop-off input at the input device;

b. in response to the drop-off input, receiving information about either the consumer or a PIN code previously sent to the customer, storing the information at a controller, and associating the stored information with one of the plurality of compartments;

c. rotating the one of the plurality of compartments associated with the stored consumer information to align with the doorway;

d. unlocking the pair of doors whereby the pair of doors may be opened inwardly, wherein an interior edge of each of the doors engages with and overlaps an outer edge of each of two dividers that define the compartment; and e. after waiting for a second time period, closing the two doors.

19. The method of claim 18, further comprising the step of locking the pair of doors after closing the pair of doors.

* * * * *